May 17, 1932.  E. T. OLSON  1,858,717
GREASE GUN APPARATUS
Filed Feb. 11, 1930   3 Sheets-Sheet 2

Elmer T. Olson,
INVENTOR.

BY Stanley Burch
ATTORNEY.

May 17, 1932.  E. T. OLSON  1,858,717
GREASE GUN APPARATUS
Filed Feb. 11, 1930   3 Sheets-Sheet 3

Elmer T. Olson
INVENTOR.

BY *Stanley Burch*
ATTORNEY.

Patented May 17, 1932

1,858,717

UNITED STATES PATENT OFFICE

ELMER T. OLSON, OF MINNEAPOLIS, MINNESOTA, ASSIGNOR TO BENTON-OLSON COMPANY, OF MINNEAPOLIS, MINNESOTA, A COPARTNERSHIP COMPOSED OF HENRY C. BENTON, LELAND R. BENTON, AND ELMER T. OLSON

GREASE GUN APPARATUS

Application filed February 11, 1930. Serial No. 427,636.

This invention relates to improvements in grease guns or pumps and feeding devices connected therewith.

An object of this invention is to provide automatic means for forcing a desired amount of grease from a tank or container into the grease pump, and cooperating plunger means within the pump for forcing the grease into the delivery pipe and hose line.

A further object of this invention is to provide a grease gun apparatus having a tank which may be readily supplied with grease by a minimum number of simple operations, a central longitudinal arranged spindle within the tank, and a feed plunger mounted in threaded relationship thereon, a grease gun or pump arranged in open communication with the tank, and actuating means for revolving the spindle and lowering the plunger a predetermined amount for forcing a desired quantity of grease into the pump or gun, where a cooperating plunger piston automatically forces the grease into the delivery pipe and hose of the ordinary type. The actuating means for revolving the spindle and lowering the tank plunger consisting of suitably arranged ratchet, pawl and lever elements eccentrically mounted on a driving shaft or spindle, operated through proper gearing from a prime mover such as a motor, the pump plunger also being mounted operatively upon the same driving shaft or spindle.

Another object of this invention is to provide a grease gun apparatus having a tank for the grease in open communication with the gun or pump, a plunger within the tank for forcing grease into the pump in a predetermined amount and ratchet means for actuating the tank plunger, a suitable construction being provided for preventing the ratchet from working or turning under excessive pressure.

Further objects of this invention will appear from the following detailed description of the device and as disclosed in the three sheets of drawings which are herewith made a part of this application.

In the drawings

Fig. 4 represents a sectional view of Fig. 1 taken along line 4—4.

Fig. 6 represents a sectional view of Fig. 2 taken along line 6—6.

Fig. 7 illustrates a plan view of the sealing device for the tank.

Figure 1:
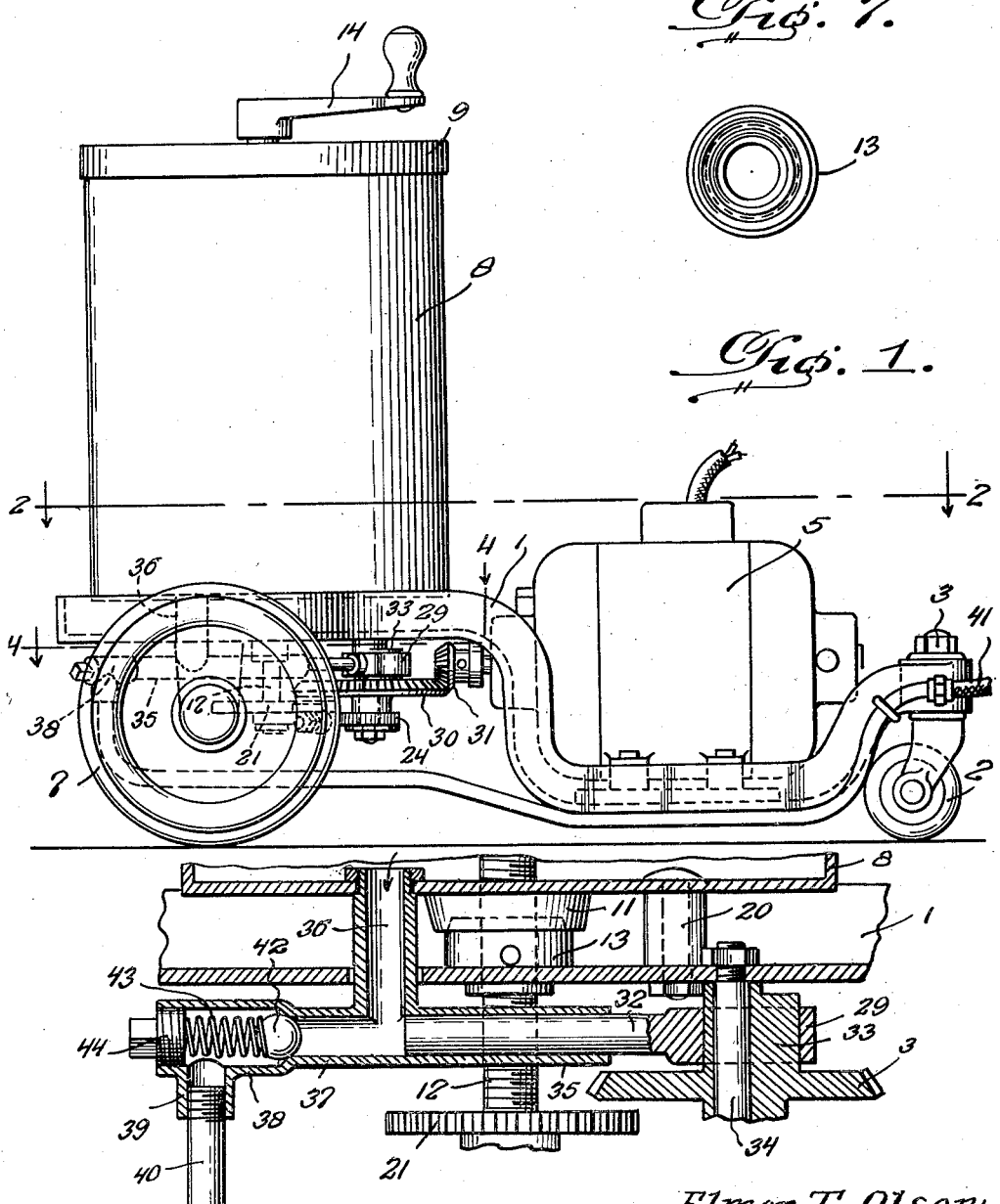
Fig. 1 illustrates a side elevational view of the grease gun apparatus with all the parts in assembled relationship.
Figure 2:
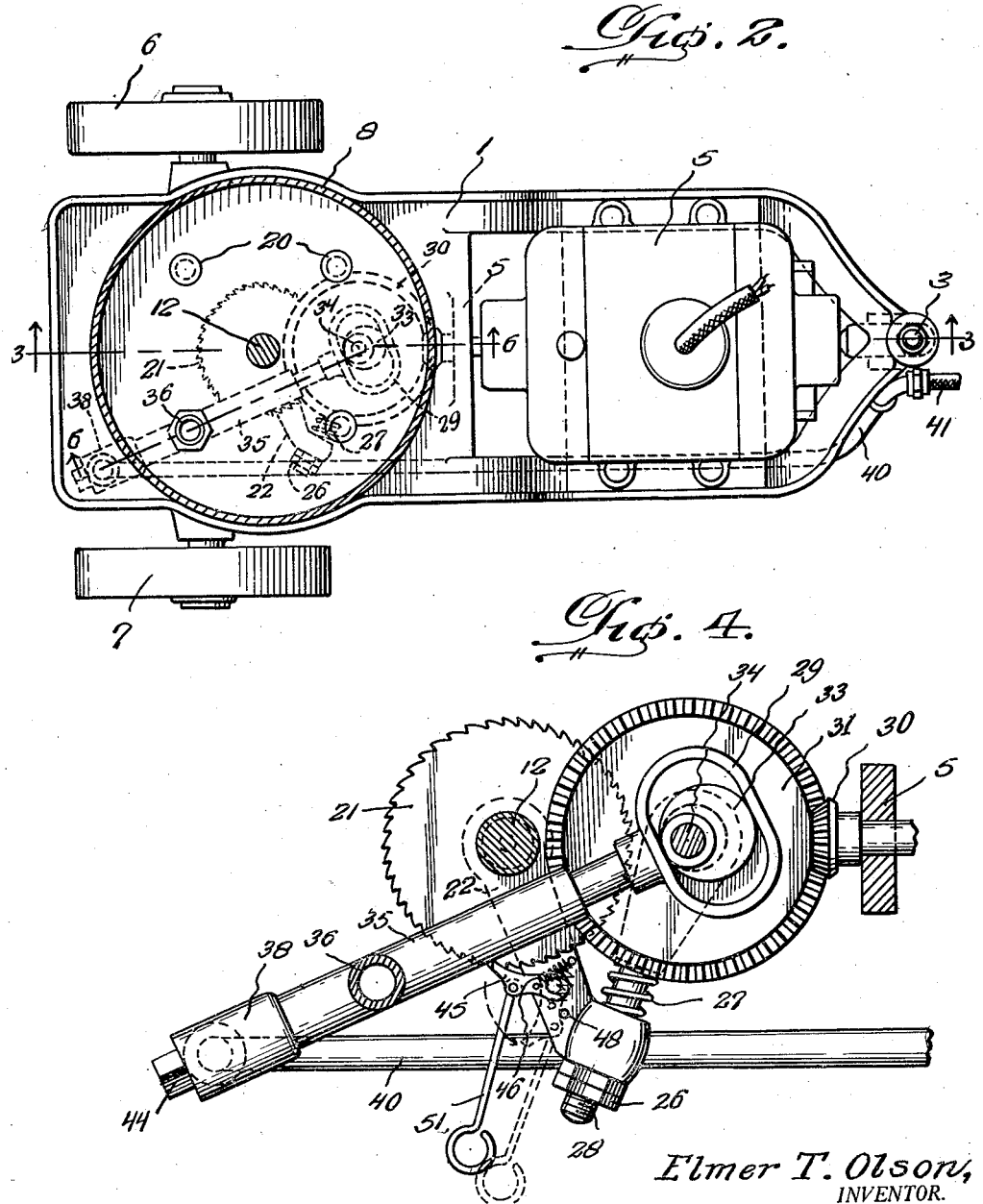
Fig. 2 represents a top plan view of the device shown in Fig. 1.
Figure 3:
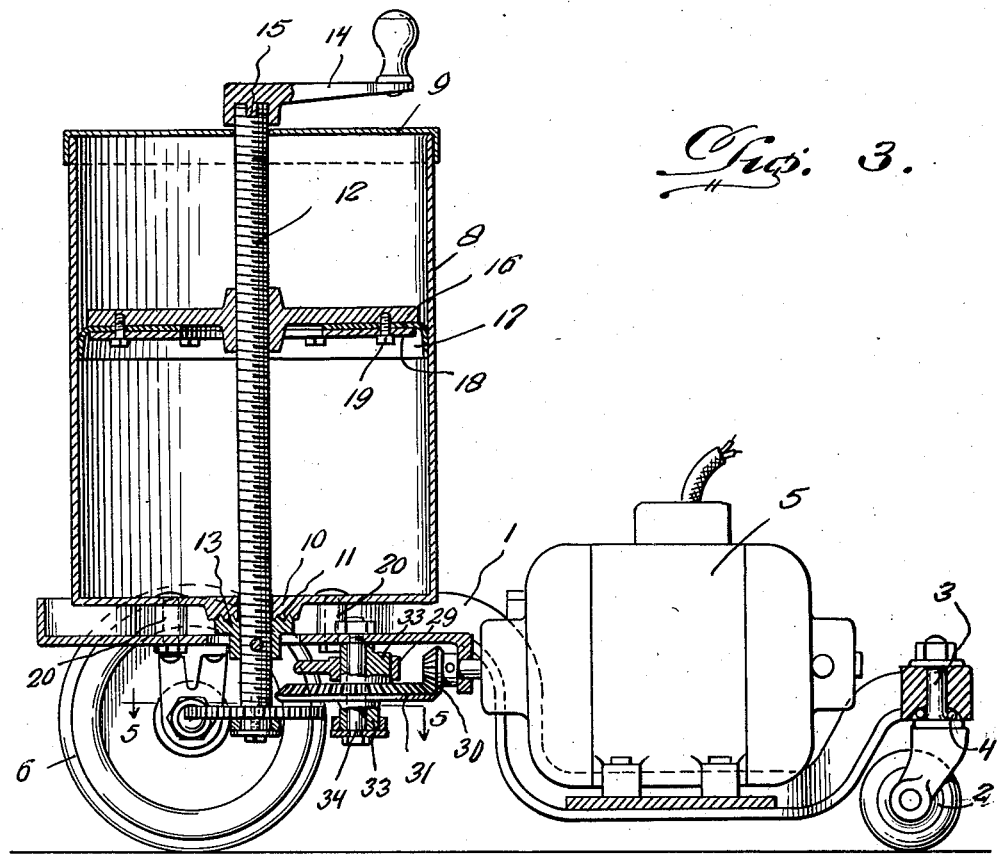
Fig. 3 illustrates a sectional view of Fig. 2 taken along line 3—3 of Fig. 2.

In the grease gun or pump apparatus according to this invention it is preferred that numeral 1 designate the carriage or supporting frame made from any suitable material and in any desired shape for supporting the apparatus. The carriage 1 is adapted to be mounted upon rear wheels 6 and 7, and a front caster 2 pivotally connected to a portion of the carriage frame as at 3, and provided with roller bearings 4. A driving motor 5 is preferably mounted on the forward part of the carriage 1, while a grease tank 8 is mounted on the rear portion thereof, and provided with a removable cover 9. A threaded feed screw 12 is slidably and longitudinally extended through the tank 8, and suitable openings in the bottom and cover thereof, means being provided for preventing the grease under pressure from leaking from the tank 8 at the point where the feed screw 12 extends through the bottom, consisting of an enlarged portion 10 formed in the bottom of the tank 8, and circular tongues 11 extending therefrom for cooperating with a grooved section 13, fixed to the feed screw 12. The tongues 11 being adapted to slidably fit in the grooves of the member or section 13 snugly so as to prevent leakage of grease from the tank. The outer end of the screw 12 is provided with a removable handle 14, having a lip portion 15 for operably connecting with the screw 12 as shown in Fig. 3.

A feed plunger 16 is threadably mounted on the screw 12 within the tank 8, and provided with a friction or seal member 17 of any suitable material such as leather, having a clamping plate 18 firmly holding the member 17 in position against the bottom of the plunger by means of fastening elements 19. The tank 8 is adapted to be securely fastened to the carriage 1 by means of bolts and sleeves as at 20 or otherwise.

Upon the inner or lower end of the screw 12 is fixedly mounted a ratchet member 21 preferably adjacent to a link element 22 loosely supported thereon, a pawl 45 being pivotally mounted upon the link element 22 for cooperating with the teeth of the ratchet 21. The free end of the link 22 is formed having a conical shaped journal bearing 23 for allowing the required movement of the shank 25 therein which extends from the lever 24 eccentrically mounted on the driving spindle 34, the shank 25 being threaded for receiving an adjusting nut 26 and of such a length that a spring 27 may be mounted thereon, thereby providing means for preventing the ratchet 21 from functioning under excessive pressure. The feed lever 24 is eccentrically mounted upon the driving spindle 34 as clearly disclosed at 28, while the pump yoke 29, having a piston or plunger element 32 extending therefrom, is preferably mounted also upon the spindle 34, the eccentric for the yoke 29 being formed integrally at 33 from the hub of the bevel driving gear 31, which is normally driven from the pinion 30 connected to the motor 5.

The grease tank 8 is in open communication with the gun or pump through a fitting 36 in the bottom thereof, which may be integrally connected with the pump cylinder section 35, and the outlet portion 37 including an enlarged portion 38 for receiving a check valve, and a nipple 39 for connection with the grease pipe line 40 and hose 41. The check valve comprising a main portion 42, a spring 43 and retaining nut 44.

Figure 5:
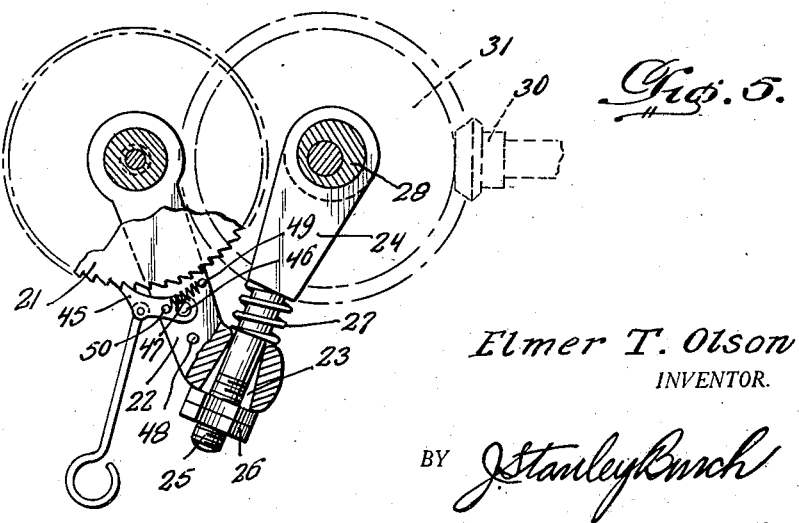
Fig. 5 illustrates a sectional view of Fig. 3, taken along line 5—5.

The pawl 45 is preferably pivoted upon the link 22 at 46, in such a manner that when released from the ratchet 21 by means of manually operating rod 51, and revolved rearwardly to contact with the stop pin 48 in the link 22 it will be retained in that position by means of the tension spring 47, which is suitably mounted to accomplish this purpose, at one end 50 to the pawl 45, and at the other end 49 to the link 22. Obviously, the spring 47, as above arranged, will also function to hold the pawl in operative position as shown in Fig. 5.

In operation this invention provides an efficient grease gun apparatus including a tank which may be easily and quickly supplied with a required amount of grease by merely releasing the pawl 45 from the ratchet member 21, and by means of the handle 14, revolve the screw 12 in order to remove the feed plunger 16 from the tank 8, after removing the plunger and cover 9, grease may be supplied to the tank and the plunger and cover replaced, the pawl 45 being again snapped into mesh with the ratchet 21, and the apparatus is ready for automatically delivering a desired amount of grease from the tank 8, through the fitting 36, into the pump or gun 35 and 37, on the operation of the ratchet 21, which is actuated from a prime mover such as a motor 5, through suitable gearing 30 and 31, and a driving spindle 34, which has mounted upon it, eccentrically, the pump plunger 32, and the feed lever 24, which in turn actuates the link 22 having mounted thereon the pawl 45 for meshing with the teeth of the ratchet 21, which functions to move a distance approximately equivalent to one tooth thereof, or otherwise as predetermined, on each stroke of the eccentrically mounted lever 24, thereby revolving the screw 12 and moving the plunger 16 in such a manner that the desired amount of grease will be delivered through the fitting 36 into the pump, and the plunger 32 will force it forward against the check valve element 42 into the grease line 40 and hose 41. In order to relieve the ratchet 21 from working under heavy and excessive pressure due in part, to the action of the pump plunger 32 cutting off the inlet 36 on the forward stroke, an adjusting nut and spring are provided on the lever 24, as clearly shown at 26 and 27.

It will be understood that many changes and modifications may be made in the form of the embodiment of the invention within the scope of the following claims without departing from the spirit thereof.

What I claim is:

1. A grease gun apparatus consisting of a grease tank, a threaded spindle extending through the tank, and a feed plunger mounted in threaded relationship thereon, a grease pump in open communication with the tank, means for forcing a predetermined amount of grease from the tank into the pump, sealing means for the tank consisting of a grooved member fixed to the spindle, and an annular lip extending from the tank and fitted in said groove.

2. A grease gun apparatus consisting of a grease tank, a threaded spindle extending through the tank, and a feed plunger mounted in threaded relationship thereon, a grease pump in open communication with the tank, means for automatically delivering a desired amount of grease from the tank into the pump, consisting of a ratchet fixed to the spindle, a link loosely mounted on the spindle, a pawl for cooperating with the ratchet pivotally mounted on the link, a driving shaft, and a lever eccentrically mounted thereon for operating the link.

3. A grease gun apparatus consisting of a grease tank, a threaded spindle extending through the tank, and a feed plunger mounted in threaded relationship thereon, a grease pump in open communication with the tank, means for automatically delivering a desired amount of grease from the tank into the pump consisting of a ratchet fixed to the spindle, a link loosely mounted on the spindle, a pawl for cooperating with the ratchet pivotally mounted on the link, a driving shaft, a lever eccentrically mounted thereon for operating the link, and a pump plunger operably mounted on the driving shaft for forcing the grease from the pump into a receiving element.

4. A grease gun apparatus consisting of a grease tank, a threaded spindle extending through the tank, and a feed plunger mounted in threaded relationship thereon, a grease pump in open communication with the tank, means for automatically delivering a desired amount of grease from the tank into the pump consisting of a ratchet fixed to the spindle, a link loosely mounted on the spindle, a pawl for cooperating with the ratchet pivotally mounted on the link, a driving shaft, a lever eccentrically mounted thereon for operating the link, and resilient means connected with the link and pawl for holding the pawl in operable and released position.

5. A device of the character described consisting of a grease tank, a spindle extending through the tank, a feed plunger threadably mounted thereon, a grease pump in open communication with the tank, means for operating the plunger and forcing a desired amount of grease from the tank into the pump, consisting of a ratchet fixed to the spindle, a link loosely mounted thereon, a pawl for cooperating with the ratchet pivotally mounted on the link, a driving shaft, a lever eccentrically mounted thereon for operating said link, and an adjustable connection between the corresponding extremities of the said link and lever for preventing the ratchet from working under heavy pressures.

6. A device of the character described consisting of a grease tank, a spindle extending through the tank, a feed plunger threadably mounted thereon, a grease pump in open communication with the tank, means for operating the plunger and forcing a desired amount of grease from the tank into the pump, comprising a ratchet fixed to the spindle, a link loosely mounted thereon, a pawl for cooperating with the ratchet pivotally mounted on the link, a drive shaft, a lever eccentrically mounted thereon for operating said link, a conical shaped bearing formed in the outer extremity of said link, and a shank formed on said lever and received by said bearing, whereby the link can be adjusted with relation to the lever to prevent the ratchet from working under heavy pressures.

In testimony whereof I affix my signature.

ELMER T. OLSON.